United States Patent
Seddigh et al.

(10) Patent No.: US 7,035,214 B1
(45) Date of Patent: Apr. 25, 2006

(54) SYSTEM AND METHOD FOR A NEGATIVE ACKNOWLEDGEMENT-BASED TRANSMISSION CONTROL PROTOCOL

(75) Inventors: Nabil N. Seddigh, Ottawa (CA); Biswajit B. Nandy, Ottawa (CA); Jamal Hadi Salim, Nepean (CA)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/406,837

(22) Filed: Sep. 28, 1999

(51) Int. Cl.
H04J 1/16 (2006.01)
H04J 3/14 (2006.01)

(52) U.S. Cl. ........... 370/231; 370/235; 714/746
(58) Field of Classification Search .......... 370/236, 370/389, 474, 229–232, 235, 390, 394, 466, 370/216, 223; 714/748, 749, 746, 18, 51, 714/55
See application file for complete search history.

(56) References Cited

U.S. PATENT DOCUMENTS

| | | | |
|---|---|---|---|
| 5,386,412 A * | 1/1995 | Park et al. | 370/270 |
| 5,630,081 A | 5/1997 | Palmer et al. | |
| 5,754,754 A * | 5/1998 | Dudley et al. | 714/18 |
| 5,815,667 A * | 9/1998 | Chien et al. | 709/232 |
| 5,912,903 A * | 6/1999 | Nakayashiki et al. | 714/749 |
| 6,118,834 A * | 9/2000 | Rasanen | 375/372 |
| 6,181,704 B1 * | 1/2001 | Drottar et al. | 370/410 |
| 6,208,620 B1 * | 3/2001 | Sen et al. | 370/231 |
| 6,269,080 B1 * | 7/2001 | Kumar | 370/236 |
| 6,392,993 B1 * | 5/2002 | Hamilton et al. | 370/230 |
| 6,400,722 B1 * | 6/2002 | Chuah et al. | 370/401 |
| 6,452,915 B1 * | 9/2002 | Jorgensen | 370/338 |
| 6,507,562 B1 * | 1/2003 | Kadansky et al. | 370/216 |
| 6,526,022 B1 * | 2/2003 | Chiu et al. | 370/229 |
| 6,538,988 B1 * | 3/2003 | Natarajan et al. | 370/216 |

OTHER PUBLICATIONS

"Total Acknowledgements: A Robust Feedback Mecahnism for End-to-End Congestion Control" J. Waldby, U. Madhow, T. V. Lakshman.

IEEE Journal on Selected Areas of Communication 1999, "Transport Protocols for Internet-Compatible Satellite Networks" Thomas R. Henderson, Randy H. Katz.

Wright M: "Using policies for effective network management" International Journal of Network Management, Wiley, GB, vol. 9, No. 2, Mar. 1999, pp. 118-125, XP002116275 ISSN: 1055-7148 p. 119, left-hand column, line 35—p. 122, left-hand column, line 5.

(Continued)

*Primary Examiner*—Dang Ton
*Assistant Examiner*—Inder Pal Mehra

(57) ABSTRACT

A system and method for transmitting data in a data communications network, using a transmission control protocol, to provide reduced acknowledgment control traffic, error recovery and congestion control. A communications link is established between a transmitter and a receiver. Setting the communications link includes setting a network congestion window to an initial length. A sequence, or stream, of data packets is sent from the transmitter to the receiver. The receiver detects any missing packets, by examining the sequence numbers of the incoming packets, and sends negative acknowledgments, generally no more than four, to the transmitter identifying the missing data packet. When the transmitter receives a negative acknowledgment, it decreases the length of the congestion window, and re-transmits the missing packet. Detection and use of round-trip time, re-transmission time-out are provided.

26 Claims, 7 Drawing Sheets

OTHER PUBLICATIONS

Interworking Task Group of IEEE 801.1; "Draft Standard P802.IQ/D7 IEEE Standards for Local and Metroplitan Area Networks: Virtual Bridged Local Area Networks" IEEE Standards—Mar. 10, 1997 ; pp. 187-198, XPOO2186357 New York—the whole document.

Stevens W: "TCP Slow Start, Congestion Avoidance, Fast Retransmit and Fast Recovery Algorithms" Internet Engineering, Task Force, Request for Comments 2001, "Online! Jan. 1997, p. 1-6 XP002227655 Retrieved from the Internet:<URL:http://www.faqs.org/ftp/rfc/pdf/rfc2001.txt.pdf> 'retrieved on Jan. 17, 2003!" p. 4, para. 2-para.3.

Jacobson V: "Congestion Avoidance and Control" Computer Communications Review, Association for Computing Machinery. New York, US, vol. 25, No. 1, 1995, p. 158-173, XP000512249: 0146-4833 p. 158, right-hand col, para. 5—p. 159, right-hand col, para. 5, p. 165.

Karn P et al: "Improving Round-Trip Time Estimates in Reliable Transport Protocols" ACM Transactions on Computer Systems Association for Computer Machinery. New York, US. vol. 9, No. 4, Nov. 1, 1991, p. 364-373, XP000274728 ISSN: 0734-2071, p. 366, para 2—para.

Gong F et al: "A new error control schemem for high speed netowrks" Tactical Communications Confernece, 1994. vol. 1. Digital Technology for the Tachical Communicator, Proceedings of the 1994 Fort Wayne, IN, USA May 10-12, 1994, New York, NY USA IEEE, US, 10.

Chan A C F et al: "TCP (transmission control protocol) over wireless links" Vehicular Technology Confernece, 1997, IEEE 47TH Phoenix, AZ, USA May 4-7, 1997, New York, NY, USA, IEEE, US May 4, 1997, p. 1326-1330, XP010229011 ISBN: 0-7803-3659-3, abstract, p. 1328, left-hand col. para 3 May 1Eitt.

Jain R: "A Timeout-Based Congestion Control Scheme for Window Flow-Controlled Networks" IEEE Journal on Selected Areas in Commmunications, IEEE Inc. New York, US, vol. SAC-4, No. 7, Oct. 1986, p. 1162-1167, XP000809513 ISSN: 0733-8716, p. 1165, left-hand col. para.

* cited by examiner

SYSTEM AND METHOD FOR A NEGATIVE ACKNOWLEDGEMENT-BASED TRANSMISSION CONTROL PROTOCOL

FIELD OF THE INVENTION

The present invention relates to digital communication methods and systems. In particular, the present invention relates to a system and method for providing a transmission control protocol (TCP) based on negative acknowledgment.

BACKGROUND OF THE INVENTION

The Internet continues to grow and to extend to new geographic locations and new network topologies, using a variety of physical media. The emergence of new network topologies and development of new physical media are parallelled by a continuous quest to improve the performance of the Internet. Developed by the U.S. Department of Defense, TCP is the most common transport layer protocol used on the Internet. TCP is built on top of Internet Protocol (IP) and is nearly always seen in the combination TCP/IP (TCP over IP). The general ability of the Internet to scale to new challenges is a testimony to the robustness and solid design behind the TCP/IP suite of protocols.

IP, upon which the Internet is based, is the protocol by which data is packaged and sent over the Internet. IP forwards each packet of information based on a 4-byte destination address, or IP number. Packets are sent to gateway machines, which route them according to their address. TCP verifies the transmission of the data. TCP adds reliable communication, flow-control, and connection-oriented communication, and provides full-duplex, process-to-process connections. TCP is capable of detecting errors and lost data and of signalling re-transmission of flawed packets, and provides self-clocking, elastic use of available bandwidth, cooperative congestion avoidance, and reliable transmission of datagrams.

By contrast, User Datagram Protocol (UDP) provides an Internet standard network layer, transport layer and session layer protocols which provide simple but unreliable datagram services. UDP is a connectionless protocol which, like TCP, is layered on top of IP. UDP neither guarantees delivery nor does it require a connection. As a result it is lightweight and efficient, but all error processing and re-transmission must be taken care of by the application program.

TCP Tahoe is the earliest implementation of TCP, and is often referred to as a benchmark for performance comparison. Several variants of TCP have emerged including TCP Reno, TCP new-Reno, TCP SACK (Selective Acknowledgment), TCP FACK (Forward Acknowledgment) and TCP Vegas.

The primary objective of these variants is to improve the performance for an individual TCP flow. This objective is achieved by modifying the flow control and congestion avoidance algorithms of TCP to maximize end-to-end TCP performance, while ensuring that the end-hosts behave like good network citizens who try to utilize unused network bandwidth, but also back off when they detect network congestion.

Generally, these prior art TCP schemes use cumulative acknowledgments, also known as ACKs, for error recovery and congestion control. In a simplified example, sequential data packets are sent from a transmitting host to a receiving host. As each packet is received at the receiving host, the receiving host sends an acknowledgment back to the transmitting host. If an error, such as a dropped packet, has occurred, the transmitting host will not receive an acknowledgment for that packet. In such a situation, the transmitting host then re-transmits the dropped packet. Where a number of acknowledgments are not received, TCP assumes that the network is congested, and decreases the transmission rate, or congestion window. Recent TCP implementations permit a receiver to send an acknowledgment that covers multiple received packets.

Recent studies of Internet traffic have shown that a significant percentage (up to 40%) of packets on the Internet contain zero bytes of data, or, in other words, contain only control information. Since up to 95% of network packets are TCP, it can be assumed that these control packets are mainly TCP acknowledgments and other TCP control packets, such as synchronization messages (SYN), and finish transmit messages (FIN). If we conservatively assume that two third of the control packets are acknowledgments, then approximately 26% of all network traffic is acknowledgments. This is a significant proportion of the packets on the network.

While acknowledgments constitute a large percentage of the packets on the Internet, it is possible to argue that they do not consume a large percentage of the bandwidth and, therefore, do not pose much of a performance concern. However, although the acknowledgments do not utilize a significant part of the bandwidth on the network, they can be problematic for a number of reasons. Acknowledgments consume significant resources in terms of load network devices, such as routers. While the network devices have less processing to do on the small acknowledgment packets, there is still a base set of resources consumed by each packet that passes through such devices, regardless of packet size. The end result of this is that the router can handle less data packets due to the load of control traffic.

Acknowledgments are susceptible to a phenomenon referred to as acknowledgment compression. This causes a bursty TCP sending pattern, and contributes to congestion and degraded performance for TCP flows. This is particularly true for asymmetric links, such as wireless, Asynchronous Digital Subscriber Line (ADSL) and satellite, where acknowledgments are transmitted at lower bandwidth rates than the data sending rates.

Acknowledgments also pose a problem in the emerging Differentiated Services IP Quality of Service (QoS) networks. In such a network, packets are explicitly marked for preferential treatment. The presence of an acknowledgment-based scheme implies that priority-marking must be performed by edge devices at both the sender and the receiver. This implies the need for double-ended Service Level Agreements (SLA), which are not viable on a large scale Internet. Further, it raises issues of scalability and an increased level of control traffic.

Finally, acknowledgments are a significant overhead for the large emerging market of low-power wireless devices such as personal digital assistants (PDA). Acknowledgment control traffic use valuable and limited resources on such devices.

It is therefore desirable to provide a system and method to reduce acknowledgment traffic generated by TCP. It is further desirable to provide a system and method for error recovery and congestion control that does not require acknowledgments.

SUMMARY OF THE INVENTION

In a first aspect, the present invention provides a data communications system employing transmission control protocol for providing error recovery and congestion control on a data communications network. The system includes a transmitter for sending a sequence of data packets, and a receiver for receiving the sequence of data packets. The transmitter has a round-trip timer that is set upon sending each data packet. The receiver can return a negative acknowledgment to the transmitter to cause re-transmission of a missing data packet. A congestion window for the network can be adjusted in response to receipt of the negative acknowledgment, or expiry of the round-trip timer. The system can further include a missing-packet timer at the receiver that is set when a negative acknowledgment is sent, and a re-transmission time-out timer at the transmitter for further controlling the congestion window.

According to a further aspect of the present invention, there is provided a method for transmitting data in a data communications network. The method begins by establishing a communications link between the transmitter and the receiver. Setting the communications link includes setting the congestion window to an initial length. A sequence of data packets is sent from the transmitter to the receiver. The receiver detects any missing packets, by examining the sequence numbers of the incoming packets, and sends negative acknowledgments, generally no more than four, to the transmitter identifying the missing data packet. When the transmitter receives a negative acknowledgment, it decreases the length of the congestion window, and re-transmits the missing packet.

In a presently preferred embodiment, the congestion window is halved in response to receipt of three duplicate negative acknowledgments. The round-trip timer can also be set upon transmitting the data packet, and the congestion window increased, typically doubled, if the round-trip timer expires without receipt of a negative acknowledgment. A keep-alive request can also be periodically sent from the transmitter to the receiver, and a re-transmission time-out timer set. If an acknowledgment to the keep-alive request is not received before expiry of the re-transmission time-out timer, the transmitter backs off for a predetermined period.

In a further aspect, there is provided a method for error recovery in a data communications network where data is transmitted as a stream of data packets sent from a transmitter to a receiver. After a missing packet is detected at the receiver, negative acknowledgments, preferably not more than four for any one missing packet, are sent to the transmitter. The missing-packet timer is set at this time, and where the missing packet is not received at the receiver in response to the negative acknowledgment before expiry of the missing-packet timer, a further negative acknowledgment is sent. The missing-packet timer is cleared upon receipt of the missing packet at the receiver.

In a further aspect of the present invention, there is provided a method for congestion control in a data communications network where data is transmitted as a sequence of data packets from a transmitter to a receiver. The congestion window is set to an initial size, a data packet is sent from the transmitter, and the round-trip timer is set. If no negative acknowledgment is received before expiry of the round-trip timer the congestion window is increased. If a negative acknowledgment is received, the length of the congestion window is decreased. The round-trip time can be estimated empirically by sending a round-trip time update request to the receiver.

In one embodiment, the congestion window is doubled, and the interval between transmission of subsequent data packets is decreased, upon expiry of the round-trip timer. In another, the congestion window is multiplicatively increased. Furthermore, a keep-alive request can be sent from the transmitter to the receiver, and the re-transmission time-out timer to detect a re-transmission time-out. If no acknowledgment of the keep-alive request is received at the transmitter, the congestion window is re-set to one for a back-off period.

BRIEF DESCRIPTION OF THE DRAWINGS

Preferred embodiments of the present invention will now be described, by way of example only, with reference to the attached Figures, wherein.

DETAILED DESCRIPTION OF THE INVENTION

Figure 1:
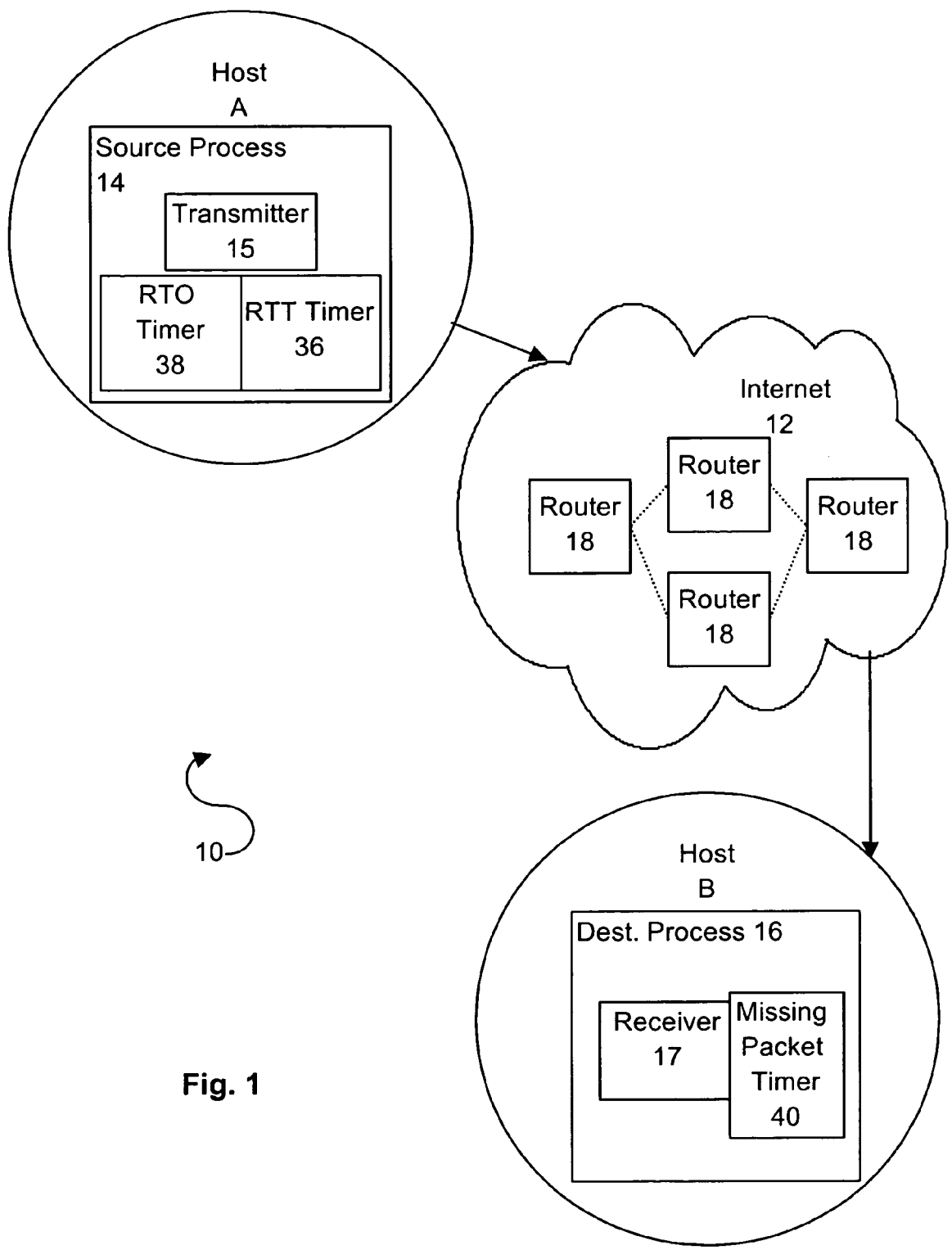
FIG. 1 is a block diagram of a network communications system.

A typical network communication system, generally designated at 10, is shown in FIG. 1. In the example depicted, system 10 consists of a first host A and a second host B connected through a network 12, such as the Internet. Hosts A and B are generally located at different locations, and are running separate application programs, referred to herein as source and destination process 14, 16. Source and destination processes 14, 16 are associated with source and destination transmission control protocol (TCP) layers which permit the transmission of digital data, and which are referred to in this description as transmitter 15 and receiver 17, respectively. As is well known, system 10 will typically have multiple hosts connected to the Internet 12 at any one time. To communicate and share information, hosts A and B pass messages, in the form of a digital byte stream, through network 12. To ensure that the messages are correctly and efficiently routed from host A to host B, and their applicable processes 14, 16, the messages generally are routed through one or more routers 18. A congestion window determines the transmission rate over network 12, and is periodically updated to prevent congestion collapse, or to take advantage of increased network bandwidth.

Figure 2:
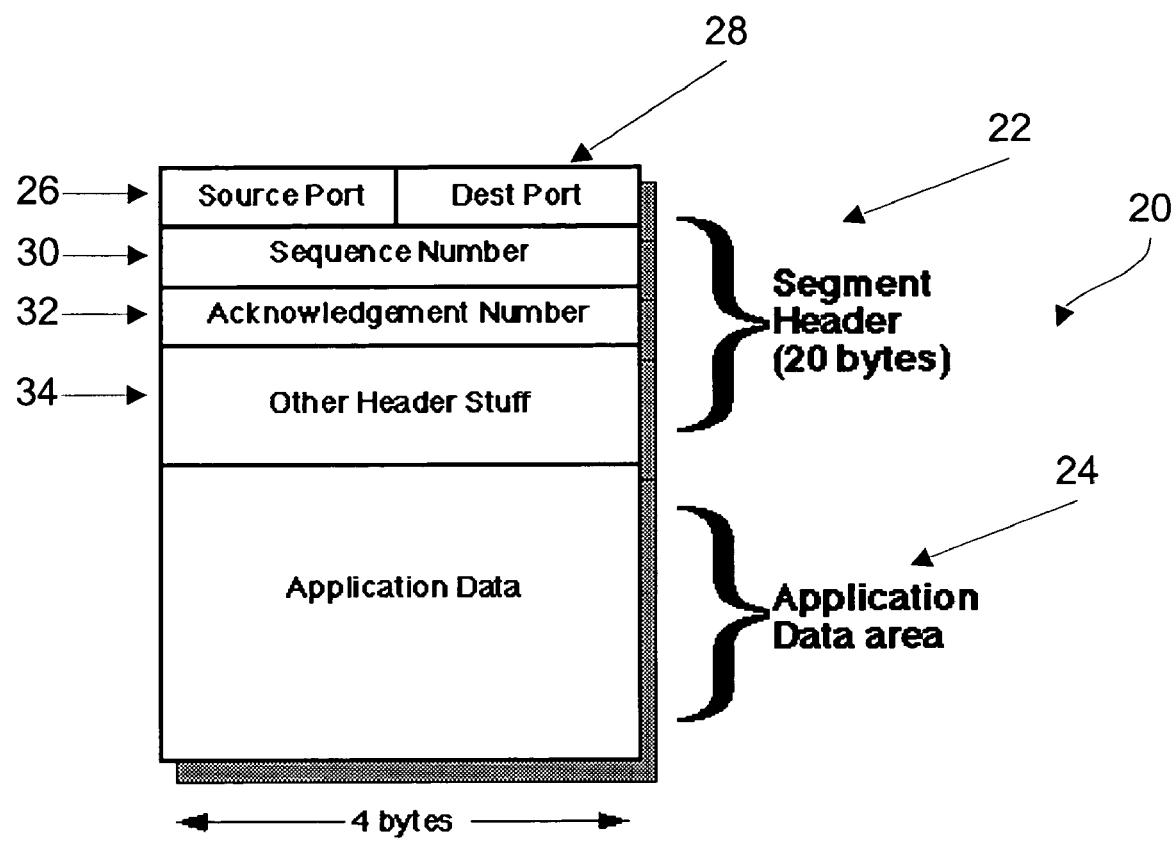
FIG. 2 is a schematic of a typical TCP packet.

In order to provide reliable, connection-oriented service, transmitter 15 breaks an incoming application byte stream into a sequence of packets 20. Packets are also referred to in the art as segments. A typical packet 20 is shown in FIG. 2, and consists of a 20-byte header 22 and, optionally, some data 24. As used herein, a data packet is a packet that contains data, and a control packet is a packet that contains only header/control information. Header 22 contains source and destination port numbers 26, 28 that identify the source process 14 from which packet 20 is sent, and the destination process 16 for which it is intended. Header 22 also includes a sequence number 30 that identifies the last byte of data sent, an acknowledgment number 32 that is to be returned to the source process 14, and other control information 34.

Port numbers 26, 28 are the addresses of transmitter 15 and receiver 17, at the source and destination, respectively. Two processes can communicate by agreeing on the port numbers they will use for communications. As used herein, a process is merely the application program currently in execution at source or destination, including the instantaneous value of all its variables in memory and registers, and the current value of its program counter.

A 3-way handshake is used to initiate and terminate TCP connections. The 3-way handshake is necessary because TCP is layered on an unreliable datagram service provided by the internet protocol (IP), such that control packets can be lost, duplicated or delivered out of order. This can lead to trouble if original or re-transmitted packets arrive while the connection is being established, and the handshake is used to overcome this eventuality. A TCP connection is closed using a well known 4-way handshake sequence where FIN control packets are sent and received.

Figure 3:
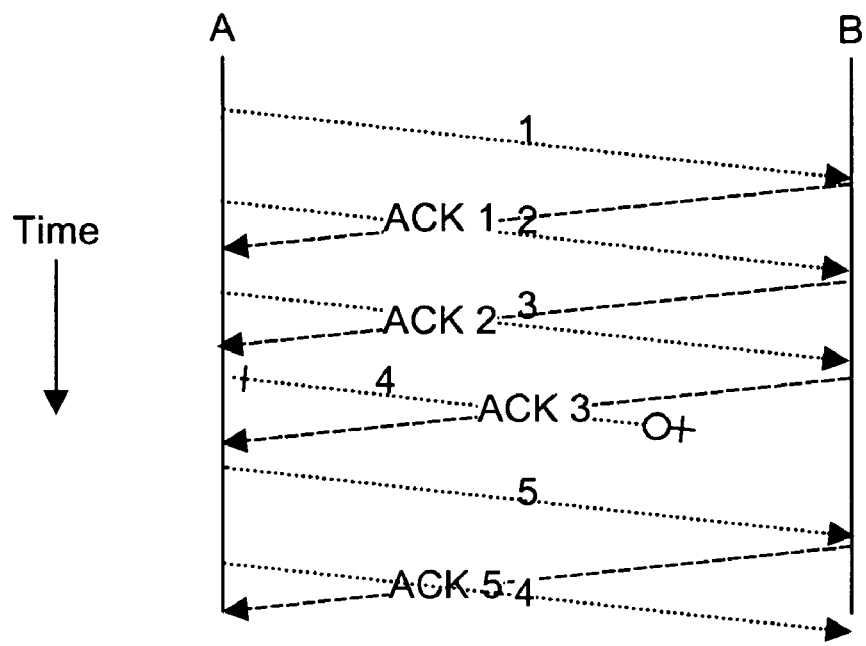
FIG. 3 shows transmission of a sequence of TCP packets according to the prior art.

FIG. 3 shows the transmission, over time, of a sequence of data packets in a typical prior art system from a transmitting host A to a receiving host B, each executing respective processes 14, 16. With reference to FIGS. 2 and 3, a sequence of packets numbered 1 to 5 from host A, and timers at the transmitter are set for each packet. When, for example, packet 1 is received correct and intact at B, a control packet, containing an acknowledgment (indicated by ACK 1), including the byte count of the last byte correctly received, is returned to A. When the acknowledgment is received at A, transmitter 15 at A recognizes that packet 1 has been received, and its respective timer is cleared.

FIG. 3 also shows the sequence of events in the prior art when the network fails to deliver a data packet. In this example, packet 4 is dropped by network 12. Since A does not receive an acknowledgment control packet (ie. no ACK 4), the timer, which was set when packet 4 was sent, times out. When the timer times out, transmitter 15 assumes that packet 4 was lost, and re-sends it to B, as indicated by the second arrow labelled 4. Transmitter 15 can potentially deliver duplicated packets, and can deliver packets out of order. Generally, TCP buffers or discards out of order or duplicated packets appropriately, using the byte count for identification.

Figure 4:
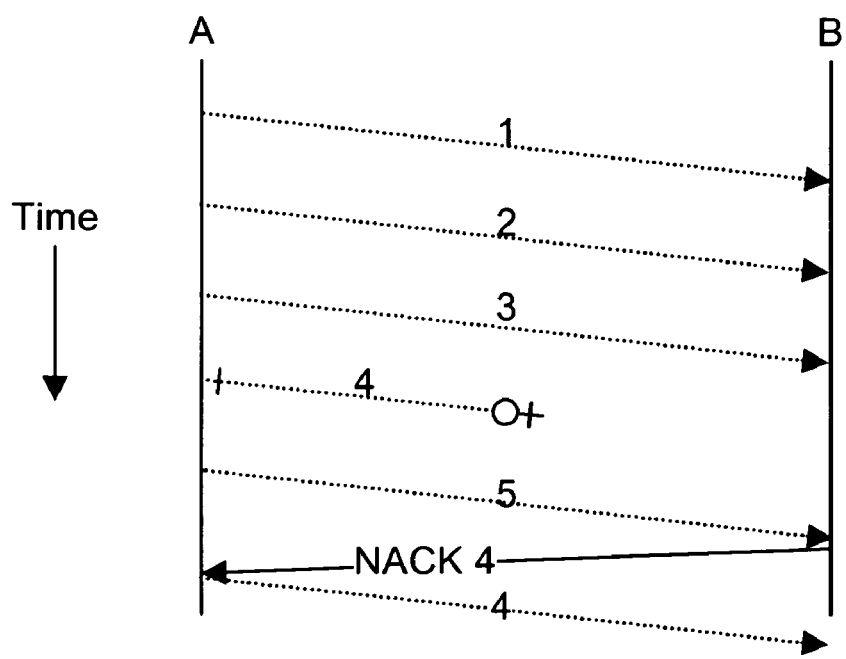
FIG. 4 is shows transmission of a sequence of TCP packets according to the present invention.

The present invention reduces the acknowledgment traffic of the prior art by replacing the prior art acknowledgments, for received data packets, with negative acknowledgments. Instead of returning an acknowledgment for each successfully received data packet, a negative acknowledgment is returned for packets that are not received. Referring to FIG. 1, transmitter 15 of the present invention includes a return trip timer 36 and a re-transmission time-out timer 38, while receiver 17 includes a missing-packet timer 40. The basic operation of the system and method of the present invention is shown in FIG. 4. As in the previous prior art example shown in FIG. 3, a sequence of packets numbered 1 to 5 is sent from host A. However when packets 1 through 3 are received correct and intact at B no acknowledgment is returned to A. Instead, transmitter 15, at host A, continues to send the sequence of packets at a predetermined rate. Packet 4 is again dropped by network 12. When packet 5 is received, receiver 17 recognizes that a packet is missing, set missing-packet timer 40, and sends a negative acknowledgment for packet 4 (ie. NACK 4) to transmitter 15. In this simplified example, transmitter 15 receives the negative acknowledgment and re-transmits missing packet 4. When packet 4 is finally received at B, the respective missing-packet timer 40 is cleared.

Figure 5:
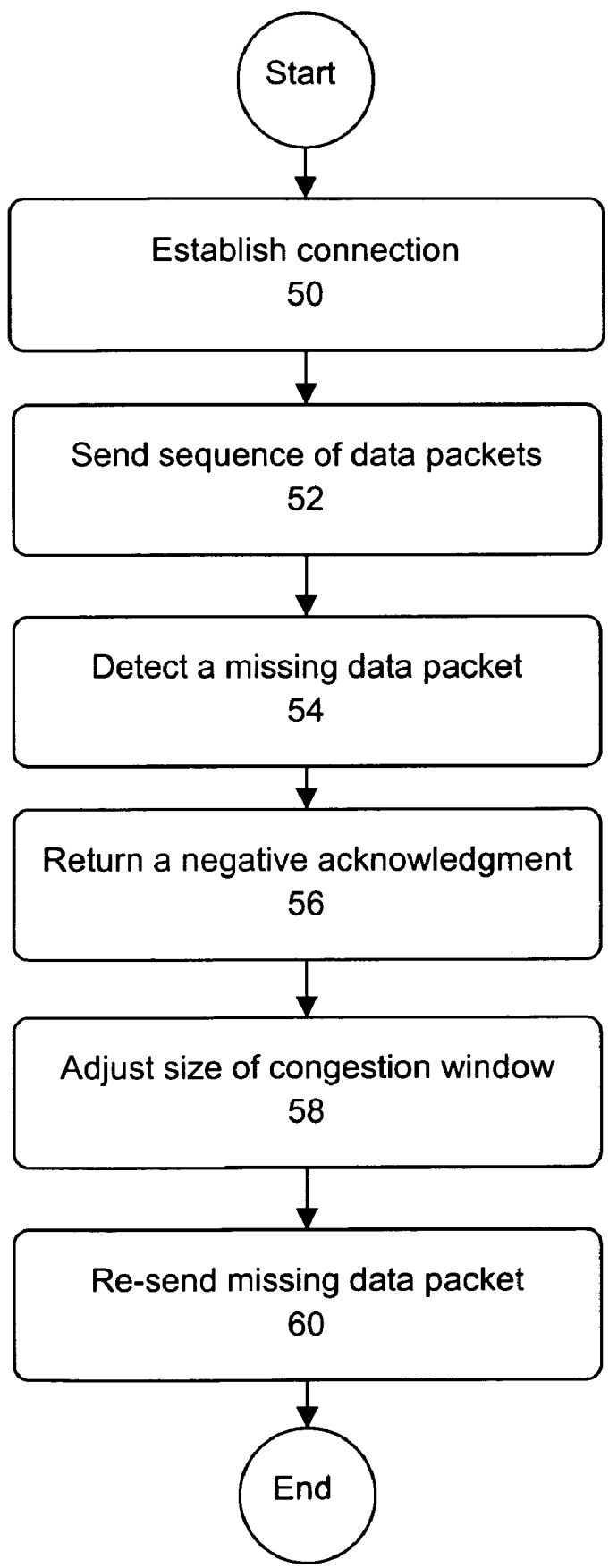
FIG. 5 is a flow chart of an embodiment of the method of the present invention.

System 10 generally operates as described in the flow chart of FIG. 5. FIG. 5 includes steps 50, 52, 54, 56, 58 and 60 described below. Initially, a communications link is established between source process 14 and destination process 16. In a preferred embodiment, the communications link is established by a conventional 3-way TCP handshake between transmitter 15 and receiver 17. At the outset, the transmission rate, or congestion window, of the link is set to an initial length. Transmitter 15 then sends a sequence of data packets 20 to receiver 16. The order of the packets 20 is determined by their respective sequence numbers 30. Receiver 17 monitors the sequence numbers 30 of the incoming packets, and detects any missing, or out of sequence, packets. If receiver 17 detects that a data packet is missing, a negative acknowledgment is sent back, or returned, to transmitter 15. The negative acknowledgment is contained within a control packet or piggybacked on a data packet, and identifies the missing data packet. In response to the success rate of packet transmission, transmitter 15 adjusts the size of the congestion. For example, the receipt of a negative acknowledgment signals to transmitter 15 that the packet may have been lost due to network congestion. Therefore, the length of the congestion window, or transmission rate over the network, is reduced. Conversely, if no negative acknowledgments are received at transmitter 15 in a particular time period, it assumes that the transmission rate can be increased, and adjusts the congestion window appropriately. The adjustment of the congestion window is further described below. Finally, in response to a negative acknowledgment is re-transmitted by transmitter 15.

Figure 6:
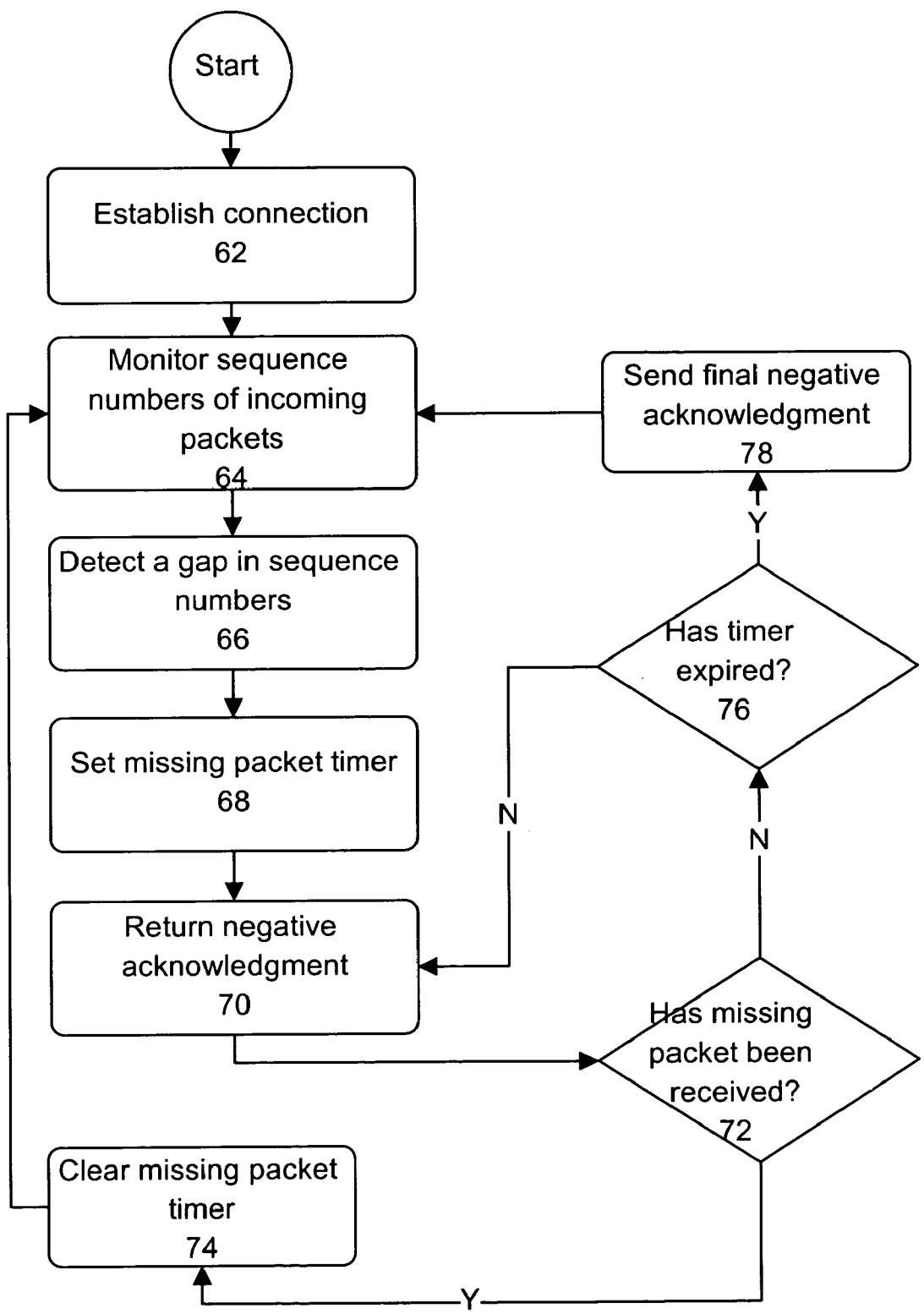
FIG. 6 is a flow chart of the receiver side of the method of FIG. 5.

The operation of system 10 at the receiver end is illustrated in the flow chart of FIG. 6, at steps 62, 64, 66, 68, 70, 72, 74, 76 and 78. Initially, a conventional opening 3-way handshake is performed. This retains the states used in prior art implementations of TCP. Thus, it is possible to extend operation of the present method to networks with deployed hosts using a variety of TCP variants. Once the handshake has been completed and transmitter 15 begins to send a sequence of packets 20 to receiver 17, receiver 17 monitors the sequence numbers of incoming packets. Receiver 17 does not respond to any received packets unless it senses a gap between the sequence numbers 30 of packets 20 that have been received. Gaps in sequence numbers 30 are sensed on arrival of out-of-order packets, or dropped packets. On detection of a gap, receiver 17 sets missing-packet timer 40, and returns a negative acknowledgment to the sender. Receiver 17 then continues to send negative acknowledgments upon receipt of successive packets until it has either successfully received the missing packet, or, in a presently preferred embodiment, it has sent a predetermined number of negative acknowledgments, such as four, for the missing packet. The negative acknowledgments are again contained within a control packet or piggybacked on a data packet, and identify the missing data packet. If the missing packet successfully arrives at receiver 17, timer 40 is cleared.

For ease of comprehension of the drawing, FIG. 6 does not show that receiver 17 continues to monitor the sequence numbers of incoming packets to detect further gaps after it has returned the negative acknowledgment and before missing-packet timer 40 is cleared, or before sending the final acknowledgment at step 78. However, as will be clear to those of skill in the art, after step 70, receiver 17 continues to monitor the incoming sequence of data packets as they arrive to detect further missing packets, and repeats the process in parallel from step 66.

Where network 12 is congested, resulting in dropped packets in both directions, it is possible that the negative acknowledgments sent by receiver 17 will also be dropped. In a presently preferred embodiment, if four negative acknowledgments are sent to transmitter 15 for a single packet, receiver 17 waits until missing-packet timer 40 expires, at which time it returns a final negative acknowledgment to transmitter 15, as shown at steps 76 and 80.

The initial duration of missing-packet timer 40 can either be an estimate of the round-trip time or some fixed delay value, such as one second. Picking a large fixed delay as the initial timer value instead of a round-trip estimation is easier and less complex to implement. The setting for missing-packet timer 40 can be adjusted according to changes in the estimated or measured round-trip time as the transmission progresses.

Figure 7:
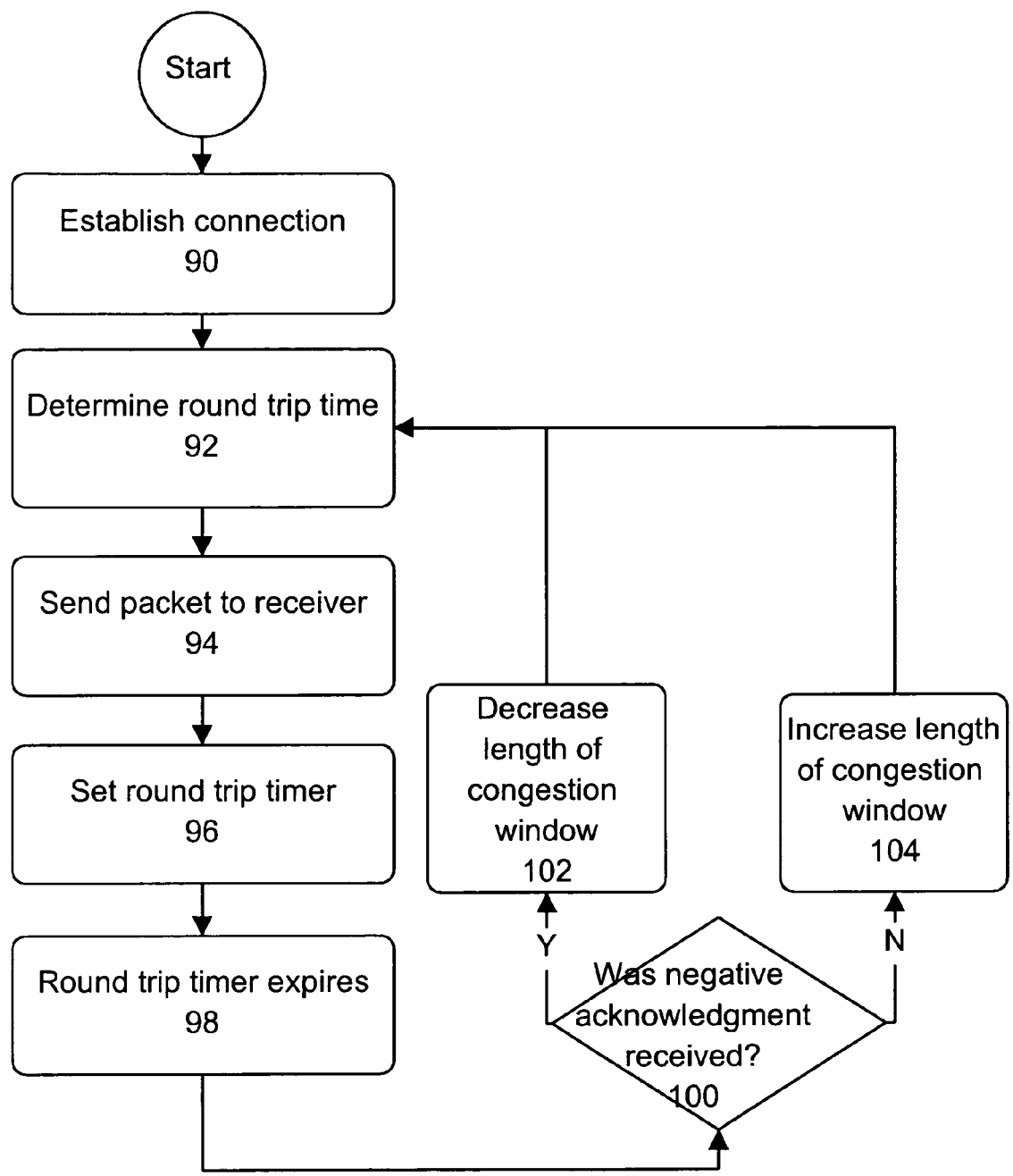
FIG. 7 is a flow chart of the transmitter side of the method of FIG. 5.

The general operation of system 10 at the transmitter end is shown in the flow chart of FIG. 7, at steps 90, 92, 94, 96, 98, 100, 102, and 104. A communications link between transmitter 15 and receiver 17 is initiated with a conventional 3-way handshake, as described above. Transmitter 16 then determines the round-trip time over network 12. The manner in which these times can be determined is described in greater detail below. A sequence of packets 20 is then sent to receiver 17, and a round-trip timer 36 and re-transmission time-out timer 38, is set for each packet. When the round-trip timer 36 for each packet expires, the size of the congestion window is adjusted. Generally, in response to receipt of negative acknowledgments at transmitter 15, the transmission rate is decreased. Where no negative acknowledgments are received in a predetermined round-trip time, the transmission rate is increased. If no negative acknowledgments are received during the round-trip time, transmitter 15 assumes packet transmission was successful and increases the congestion window. The transmitter 15 then returns to step 92, where the round-trip time is updated, as necessary, and continues to inject packets into network 12. This process continues until there are no more data packets to transmit, or until a re-transmission time-out occurs, as will be described below.

As shown at steps 102 and 104, the present invention adjusts the size of the congestion window, or transmission rate, whenever a negative acknowledgment is received at transmitter 15. The adjustment ensures that packets 20 are injected into network 12 in a controlled fashion to avoid congestion collapse. Multiplicative increase during slow-start, and additive increase and multiplicative decrease during congestion avoidance, can be used, in conjunction with an inferred round-trip time to set the rate of transmission and to permit transmitter 15 to elastically utilize free network bandwidth and back off in the presence of sensed network congestion. In the example shown in FIG. 7, adjustment of the congestion window occurs after each packet is sent and round-trip timer 36 expires. In reality, receipt of a negative acknowledgment at any time at transmitter 15 will result in adjustment of the congestion window length, as shown at steps 100 to 104.

When the connection is first established, as in other implementations of TCP, transmitter 15 starts in a slow-start mode, and a single packet is sent to receiver 17. Alternatively, an increased initial window size, as is proposed for TCP Reno, can be used. Again, if no negative acknowledgments are received during the round-trip time, transmitter 15 assumes packet transmission was successful and increases the congestion window. Typically, in slow start, the congestion window is doubled in size.

Generally, the inventors of the present invention contemplate that the congestion window can be increased in one of three ways after start up. The choice of the congestion window increase method to be used depends on the level of accuracy desired for congestion control. In the simplest embodiment, if no negative acknowledgment is received on expiry of the round-trip timer 36 set for a packet, the congestion window is doubled, and all queued packets are sent in a continuous sequence. If no negative acknowledgments are received for these packets, the congestion window is again doubled at the expiry of each round-trip timer 38, and the process repeats.

In another embodiment, the congestion window is doubled on the expiry of each round-trip timer 36. However, rather than transmitting the queued packets in a burst, they are transmitted with some minimal interval between each packet. The interval time between packets can be chosen as desired. For example, the interval can be chosen such that transmission of all packets is completed during one round-trip time.

In a further embodiment multiplicative increase is achieved. A single packet is transmitted and round-trip timer 36 is set, as described above. If no negative acknowledgment is received for the first packet, then second and third packets are transmitted in staggered fashion at an interval calculated according to:

$$\text{Interval} = (RTT/cwin)*(1/a)$$

where RTT is the round-trip time; cwin is the length of the congestion window; and a is the number of packets being sent in a staggered fashion. A round-trip timer 36 is set for each of the second and third packets when they are transmitted. If no negative acknowledgment is received on expiry of timer 36 set for the second packet, the size of the congestion window is doubled, and four more packets are sent in a staggered manner, and respective timers 36 are set. On expiry of the timer 36 set for the third packet where no negative acknowledgment is returned, the congestion window is again increased by a factor of two. This results in a congestion window four times the original length. Eight packets are then sent in a staggered fashion according to the above equation, and a round-trip timer 36 is set for each one. The congestion window continues to be doubled if no negative acknowledgments are received at the expiry of each timer, and the number of packets sent is doubled accordingly.

In a presently preferred embodiment, regardless of the method used to increase the congestion window, on receipt of three duplicate negative acknowledgments, the length of the congestion window is halved, and set as a threshold value.

Accurately inferring the round-trip time can be important since it can play a key role in adjusting the transmission rate, as described above. As is known to those of skill in the art, in the prior art round-trip time is generally calculated by a method developed by Van Jacobson. Van Jacobson's method uses receipt time of acknowledgments for each packet to measure the round-trip time per packet, and then calculates a smoothed running round-trip time estimator. The re-transmission time-out can then be calculated based on the smoothed round-trip time estimator, plus four times a mean deviation estimator. The calculation of the re-transmission time-out is not performed for every packet transmitted, but, in accordance with Karn's algorithm, only when a packet is transmitted for the first time.

In the present invention, the initial round-trip time can be estimated, as in the prior art, during the synchronization phase of the 3-way handshake. However, since the round-trip time can vary over the life of a connection, it is preferable that it be updated during the network session on an ongoing basis. In a presently preferred embodiment, the round-trip time is updated by periodically setting a TCP option on an outgoing data packet requesting a round-trip time update. On detecting this round-trip time update request, receiver 17 responds with a forced acknowledgment, a round-trip time update acknowledgment, the purpose of which is to measure the current round-trip time. This permits the use of Van Jacobson's method for calculating the round-trip time.

As will be appreciated by those of skill in the art, the window size of receiver 17 must also be periodically provided to transmitter 15. In the event that data packets are sent from receiver 17 to transmitter 15, this information can be piggy-backed on such packets. In the absence of data packets from receiver 17, receiver 17 can periodically generate window update acknowledgments to transmitter 15. Two distinct window update acknowledgments can be generated. The first can be a timed window update packet which is generated by receiver 17 at regular intervals. The second can be a forced window update packet which is generated by receiver 17 whenever the receive window drops below a certain threshold. With the cheap price of memory, the receiver windows on end-hosts can be large. Therefore, it is currently contemplated that sending forced window update acknowledgments should be sufficient.

Generally, retransmission time-outs are required because individual negative acknowledgments may not reach transmitter 15. Negative acknowledgments like all other packets are susceptible to loss in routers 18, route flapping and physical connection failure. On a re-transmission time-out, transmitter 15 backs off for a predetermined period, ie. it goes into slow-start and sets its congestion window to one. Transmitter 15 then operates in multiplicative increase mode until it hits a threshold value, at which point it reverts to a linear increase for the congestion window. The threshold value can either be threshold value set when transmitter 15 receives three duplicate negative acknowledgments, as described above. Or, if such a threshold value has not been previously set, the threshold value is set, on detection of a re-transmission time-out, as half the value of the current congestion window length. An exponential back-off for re-transmission time-out can also be implemented, as in the prior art. In the presence of successive re-transmission time-outs, the back off duration is doubled for each re-transmission time-out. The re-transmission time-out can be calculated in the same manner as in TCP Reno, or as described below.

Figure 8:
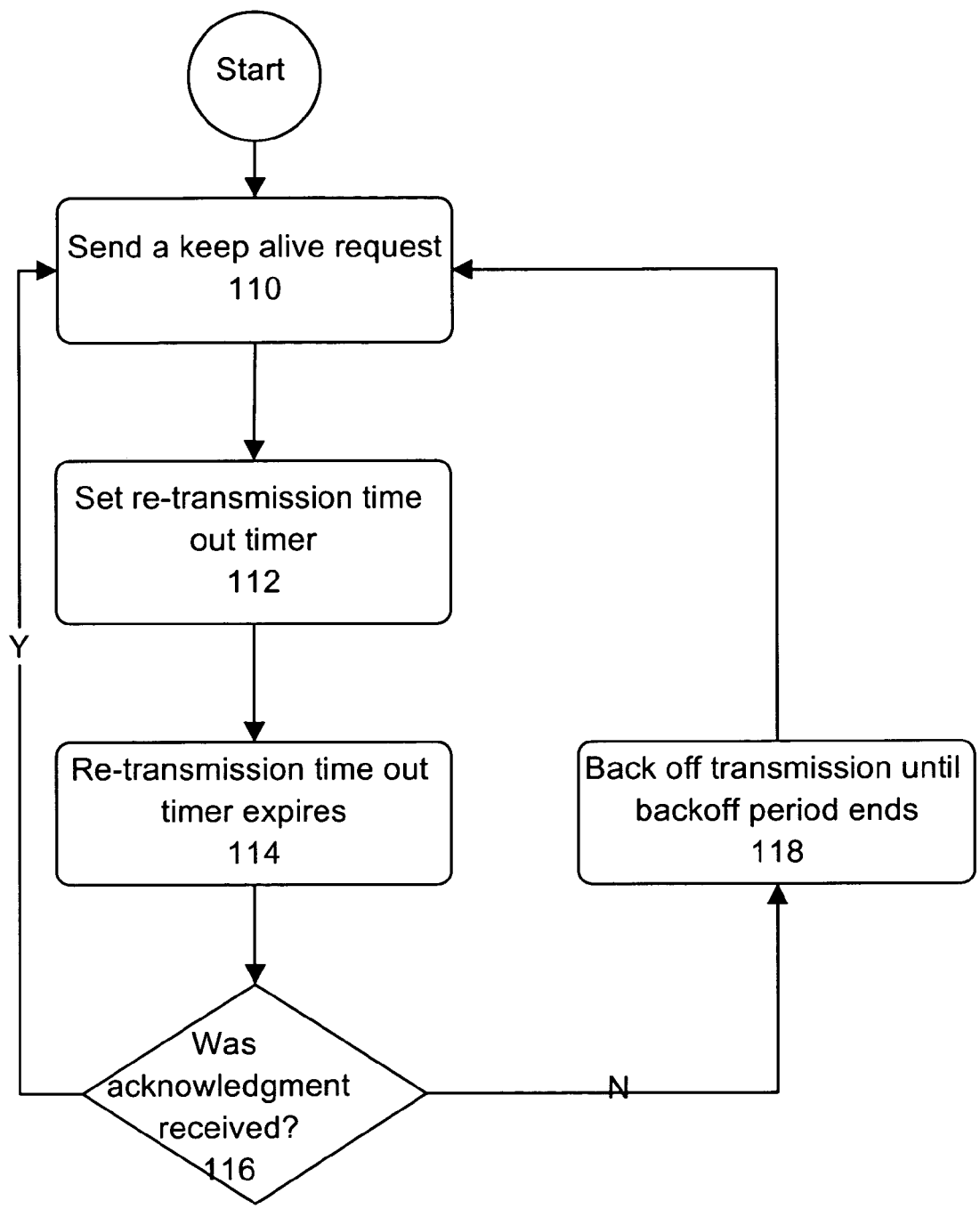
FIG. 8 is a flow chart of a re-transmission time-out according to the present invention.

Since, in the system of the present invention, negative acknowledgments are only sent when receiver 17 detect problems, no negative acknowledgment over a long period of time can either indicate a serious problem because the negative acknowledgments are not getting through or can indicate that the network is lightly loaded and has not yet encountered a problem serious enough to warrant a negative acknowledgment. Since transmitter 15 cannot rely on the presence or absence of negative acknowledgments for re-transmission time-out detection, it can periodically generate keep-alive requests on a much finer granularity than a keep-alive timer in the prior art, which is in the range of one second. Receiver 17 can generate an acknowledgment in response to the keep-alive request. For example, as shown in FIG. 8 at steps 110, 112, 114, 116, and 118, transmitter 15 periodically transmits a keep-alive request, typically piggy-backed on an outgoing data packet, and set re-transmission time-out timer 38. If an acknowledgment for the keep-alive request is returned within the re-transmission time-out interval, the re-transmission time-out timer 38 is cleared, and the process repeats at predetermined periods. If no acknowledgment is received at transmitter 15 within the retransmission time-out interval, a re-transmission time-out occurs, and transmitter 15 backs off for a predetermined period, preferably according to the exponential back-off algorithm. On return from back-off, the process repeats. Generally, no packets are re-transmitted unless negative acknowledgments are received from receiver 17, and packet transmission continues with the next scheduled packet. Packets lost in network 12 will be negatively acknowledged when receiver 17 determines which, if any, packets were lost.

To end transmission, the present invention uses a 4-way closing handshake, as in the prior art. While receiver 17 has no way of detecting lost finish messages, transmitter 15 can detect the lack of an acknowledgment for the finish request, and will resend the finish request.

In a further embodiment of the present invention, it is contemplated that negative acknowledgments can be used to convey information about a missing range of packets as opposed to just one packet. However, this necessitates a more complex congestion avoidance scheme.

The present invention eliminates the large number of acknowledgments generated by typical TCP hosts to acknowledge receipt of data packets. However, it introduces several new messages, including the negative acknowledgment; forced, periodic or requested window update request; keep-alive request, return trip time update request. To reduce the overhead consumed by the above control messages, it is contemplated that the additional messages sent by transmitter 15 can be piggy-backed onto data packets, and that responses from receiver 17 can be piggy-backed onto negative acknowledgments where available. If no negative acknowledgments are available, the receiver responses can be combined into a single packet where applicable. It is believed that this will sufficiently reduce the amount of out-of-band traffic required to implement the present invention.

Inter-operation between the present invention and heterogeneous hosts running different variants of TCP can be achieved by simple modification to the opening 3-way handshake. TCP option fields can be set that permit the transmitter and receiver to negotiate use of an appropriately supported version of TCP.

The main advantage of the present invention is that it introduces fewer control packets on the network than prior art implementations of TCP. It is estimated that under the present invention the ratio of negative acknowledgment to data packets will be proportional to the network loss rate. A study of the Internet showed sample loss rates of 5%. In such an environment, one would expect only 5–10% of network packets to be negative acknowledgments as opposed to the current scheme where roughly 26% of network packets are acknowledgments. The present invention can be particularly beneficial to congested routers, asymmetric links, emerging Diffserv QoS networks and low power devices in a wireless environment.

The present invention retains reliable data transfer and congestion/flow control, which are the hallmarks of TCP. The receiver generates negative acknowledgments only for missing packets, while providing for additive increase on high bandwidth networks, and multiplicative decrease on inference of upcoming congestion.

A further advantage of the present invention is that, in general, the prior art congestion control principles are retained. Only minor modifications are required to permit the transmitter to elastically use free network bandwidth, and to back-off in the presence of sensed network congestion. Additionally, as other congestion avoidance algorithms are developed, they can be integrated with the present invention.

The above-described embodiments of the invention are intended to be examples of the present invention and alterations and modifications may be effected thereto, by those of skill in the art, without departing from the scope of the invention which is defined solely by the claims appended hereto.

We claim:

1. A method of transmitting data in a data communications network, comprising the steps of:
   (i) establishing a connection-oriented communications link between a transmitter and a receiver through a Transmission Control Protocol (TCP) handshake, the communications link having a congestion window set to an initial length;
   (ii) transmitting data packets in TCP from the transmitter to the receiver;
   (iii) sending periodically a keep-alive request from the transmitter to the receiver, whereupon a re-transmission time-out timer is set,
   (iv) determining, at the transmitter, if an acknowledgment to the keep-alive request is not received before expiry of the re-transmission time-out timer, whereupon the transmitter backs off for a predetermined period;
   (v) detecting a missing data packet at the receiver;
   (vi) sending a negative acknowledgment from the receiver to the transmitter for the missing data packet, the receiver being unresponsive to any packets from the transmitter unless the receiver detects the missing data packet;
   (vii) decreasing, at the transmitter, the length of the congestion window in response to receipt of the negative acknowledgment; and
   (viii) re-transmitting the missing data packet.

2. The method according to claim 1, wherein up to four duplicate negative acknowledgments are sent from the receiver.

3. The method according to claim 1, wherein the congestion window is halved at step (vii).

4. The method according to claim 1, further including a step of setting a round-trip timer at the transmitter upon transmitting the data packet, and a step of increasing the congestion window in response to the expiry of the round-trip timer.

5. The method according to claim 4, wherein the step of increasing the congestion window increases the congestion window if no negative acknowledgement is received upon expiry of the round-trip timer.

6. The method according to claim 5, wherein the congestion window is doubled.

7. The method according to claim 1, further comprising a step of generating, at the receiver, an acknowledgement in response to the keep-alive request, the receiver being responsive only to the missing data packet and the keep-alive request.

8. The method according to claim 1, wherein the congestion window is decreased in response to three duplicate negative acknowledgments.

9. The method according to claim 1, wherein the data communications network in an internet.

10. A method for error recovery in a data communications network where data is transmitted in Transmission Control Protocol (TCP) as a sequence of data packets sent from a transmitter to a receiver, comprising the steps of:
    establishing a connection-oriented communication link between the transmitter and the receiver being established through a TCP handshake;
    sending periodically a keep-alive request from the transmitter to the receiver, whereupon a re-transmission time-out timer is set,
    determining, at the transmitter, if an acknowledgment to the keep-alive request is not received before expiry of the re-transmission time-out timer, whereupon the transmitter backs off for a predetermined period;
    detecting a missing data packet at the receiver;
    sending a negative acknowledgment from the receiver to the transmitter for the missing data packet, the receiver being unresponsive to any packets from the transmitter unless the receiver detects the missing data packet;
    setting a missing-packet timer at the receiver upon sending the negative acknowledgment; and
    where the missing data packet is not received at the receiver in response to the negative acknowledgment before expiry of the missing-packet timer, sending a further negative acknowledgment.

11. The error recovery method according to claim 10, wherein the step of detecting a missing data packet includes the step of detecting a missing data packet according to a gap in sequence numbers of the stream of data packets, the step of setting a missing-packet timer settings a missing data packet timer when the gap is detected.

12. The error recovery method according to claim 10, wherein up to four negative acknowledgments are sent from the receiver to the transmitter before expiry of the missing-packet timer.

13. The error recovery method according to claim 10, wherein the missing-packet timer is cleared upon receipt of the missing data packet at the receiver.

14. A method for congestion control in a data communications network where data is transmitted as a sequence of data packets from a transmitter to a receiver, comprising the steps of:
    establishing a connection-oriented communication link between the transmitter and the receiver being established through a Transmission Control Protocol (TCP) handshake;
    setting a congestion window to an initial size, the congestion window relating to a transmission rate over the network;
    transmitting a data packet in TCP from the transmitter to the receiver;
    setting a round-trip timer at the transmitter upon sending the packet;
    sending a negative acknowledgement for a missing data packet from the receiver to the transmitter, the receiver being unresponsive to any packets from the transmitter unless the receiver detects the missing data packet;
    increasing the congestion window if no negative acknowledgment for the missing data packet is received before expiry of the round-trip timer; and decreasing the congestion window if the negative acknowledgment for the missing data packet is received at the transmitter, wherein the congestion window is doubled, and an interval between transmission of subsequent data packets is decreased, upon expiry of the round-trip timer.

15. The congestion control method according to claim 14, further including a step of empirically determining the round-trip time.

16. The congestion control method according to claim 15, further comprising the step of sending a round-trip time update request to the receiver, the receiver being responsive only to the missing data packet and the round-trip time update request.

17. The congestion control method according to claim 14, wherein the step of increasing the congestion window includes the step of multiplicatively increasing the congestion window if no negative acknowledgement for the missing data packet is received before expiry of the round-trip timer.

18. The congestion control method according to claim 14, further including steps of sending a keep-alive request from the transmitter to the receiver, and setting a re-transmission timeout timer to detect a re-transmission timeout, the receiver being responsive only to the missing data packet and the keep-alive request.

19. The congestion control method according to claim 18, wherein the congestion window is set to one for a back-off period if no acknowledgment is received in response to the keep-alive request, before expiry of the re-transmission time-out timer.

20. A data communications system employing transmission control protocol for providing error recovery and congestion control on a data communications network, comprising:
 a transmitter for sending a sequence of data packets in Transmission Control Protocol (TCP), the transmitter having a round-trip timer that is set upon sending each data packet;
 a receiver for receiving the sequence of data packets, a connection-oriented communication link between the transmitter and the receiver being established through a TCP handshake, the receiver detecting a missing data packet in the sequence of data packets, and returning a negative acknowledgment for the missing data packet to the transmitter to cause re-transmission of the missing data packet, the receiver being unresponsive to any packets from the transmitter unless the receiver detects the missing data packet; and
 means for increasing the congestion window if no negative acknowledgment for the missing data packet is received before expiry of the round-trip timer, and decreasing the congestion window if the negative acknowledgment for the missing data packet is received at the transmitter, wherein the congestion window is doubled, and an interval between transmission of subsequent data packets is decreased, upon expiry of the round-trip timer.

21. The system according to claim 20, further including a missing-packet timer at the receiver upon expiry of which a final negative acknowledgment is sent to the transmitter.

22. The system according to claim 20, further including a re-transmission time-out timer at the transmitter, the means for adjusting responding to expiry of the re-transmission time-out timer.

23. The system according to claim 20, wherein the transmitter includes means for setting a congestion window to an initial size, the congestion window relating to a transmission rate over the network, the adjusting means including means for increasing the congestion window if no negative acknowledgment for the missing data packet is received before expiry of the round-trip timer, and means for decreasing the congestion window if the negative acknowledgment for the missing data packet is received.

24. A method for congestion control in a data communications network where data is transmitted as a sequence of data packets from a transmitter to a receiver, comprising the steps of:
 setting a congestion window to an initial size, the congestion window relating to a transmission rate over the network;
 transmitting a data packet in Transmission Control Protocol (TCP) from the transmitter to the receiver;
 setting a round-trip timer at the transmitter upon sending the packet;
 increasing the congestion window if no negative acknowledgment for the data packet is received before expiry of the round-trip timer; and
 decreasing the congestion window if a negative acknowledgment for the data packet is received at the transmitter
 wherein the congestion window is doubled, and an interval between transmission of subsequent data packets is decreased, upon expiry of the round-trip timer.

25. A system for transmitting data in a data communications network, comprising:
 a receiver; and
 a transmitter,
 a communications link between the transmitter and the receiver being established through a Transmission Control Protocol (TCP) handshake, the communications link having a congestion window set to an initial length;
 the transmitter including means for transmitting data packets in TCP to the receiver;
 the receiver including means for detecting a missing data packet, means for sending a negative acknowledgment to the transmitter for the missing data packet, the receiver being unresponsive to any packets from the transmitter unless the receiver detects the missing data packet,
 the transmitter further including means for decreasing the congestion window in response to receipt of the negative acknowledgment, and means for re-transmitting the missing data packet,
 the transmitter further including means for increasing the congestion window if no negative acknowledgment for the missing data packet is received before expiry of the round-trip timer; and means for decreasing the congestion window if the negative acknowledgment for the missing data packet is received at the transmitter, wherein the congestion window is doubled, and an interval between transmission of subsequent data packets is decreased, upon expiry of the round-trip timer.

26. The system according to claim 25, wherein the receiver further includes means for setting a missing-packet timer upon sending the negative acknowledgment, and means for sending a further negative acknowledgment when the missing data packet is not received in response to the negative acknowledgment before expiry of the missing-packet timer.

* * * * *